United States Patent [19]

Carter

[11] 4,220,209
[45] Sep. 2, 1980

[54] PLOW WITH IMPROVED TOOL RAISING CONSTRUCTION

[76] Inventor: William W. Carter, Rte. 1, Brundidge, Ala. 36010

[21] Appl. No.: 912,300

[22] Filed: Jun. 5, 1978

[51] Int. Cl.² ............... A01B 59/044; B62D 51/04
[52] U.S. Cl. ............................ 172/259; 172/260; 172/398
[58] Field of Search ............... 172/43, 244, 256, 257, 172/258, 259, 260, 297, 298, 318, 319, 337, 354, 397, 398, 664, 668, 675

[56] References Cited

U.S. PATENT DOCUMENTS

| | | | |
|---|---|---|---|
| 2,016,774 | 10/1935 | Geffroy | 172/257 |
| 4,155,408 | 5/1979 | Welborn | 172/257 |

FOREIGN PATENT DOCUMENTS

| | | | |
|---|---|---|---|
| 177057 | 12/1953 | Austria | 172/257 |
| 950419 | 10/1956 | Fed. Rep. of Germany | 172/257 |
| 239705 | 2/1946 | Switzerland | 172/256 |
| 664101 | 1/1952 | United Kingdom | 172/398 |

*Primary Examiner*—Richard T. Stouffer
*Attorney, Agent, or Firm*—Jennings, Carter & Thompson

[57] ABSTRACT

The application discloses a multi-row plow adapted to be towed behind a small walking tractor. The plow comprises a draft frame having a pivotal attachment to the tractor and a tool frame. At the rear of the tool frame there is a ground engaging wheel. Apparatus is provided to change the elevation of the wheel relative to the draft frame, thereby to adjust the elevation of the rear end of the draft frame. Linkage causes the forward end of the tool frame to be raised when the rear end of the draft frame is raised, and vice versa. The foregoing provides a simple and labor-saving way of removing the tool from the ground at the end of the row for turning the apparatus around.

1 Claim, 7 Drawing Figures

PLOW WITH IMPROVED TOOL RAISING CONSTRUCTION

My invention relates to an improved plow and has for its object the provision of a plow adapted to be towed behind a two-wheel tractor or the like and which incorporates means for raising the tools out of the ground at the end of the row, with minimum effort, facilitating the turn-around of the rig at the end of each row.

More particularly, an object of my invention is to provide a light duty garden plow which comprises a draft frame and a tool carrying frame, together with means pivotally to associate the tool frame with the draft frame, the draft frame being provided at its rear end with a ground engaging wheel, and there being manually operated means effective to pivot the wheel so as to raise and lower the rear end of the draft frame, in combination with linkage means simultaneously effective upon pivoting said wheel as aforesaid to raise the tool frame relative to the draft frame, thus to raise the tools above Other objects are to provide a plow of the character designated which shall be simple and light in construction yet strong and durable; and to provide means for adjusting the lateral position of the supporting wheel at the rear of the plow while at the same time permitting the member on which the wheel is mounted to pivot relative to the draw frame.

A plow and towing tractor illustrating features of my invention are shown in the accompanying drawings, forming a part of this application, in which.

Figure 1:
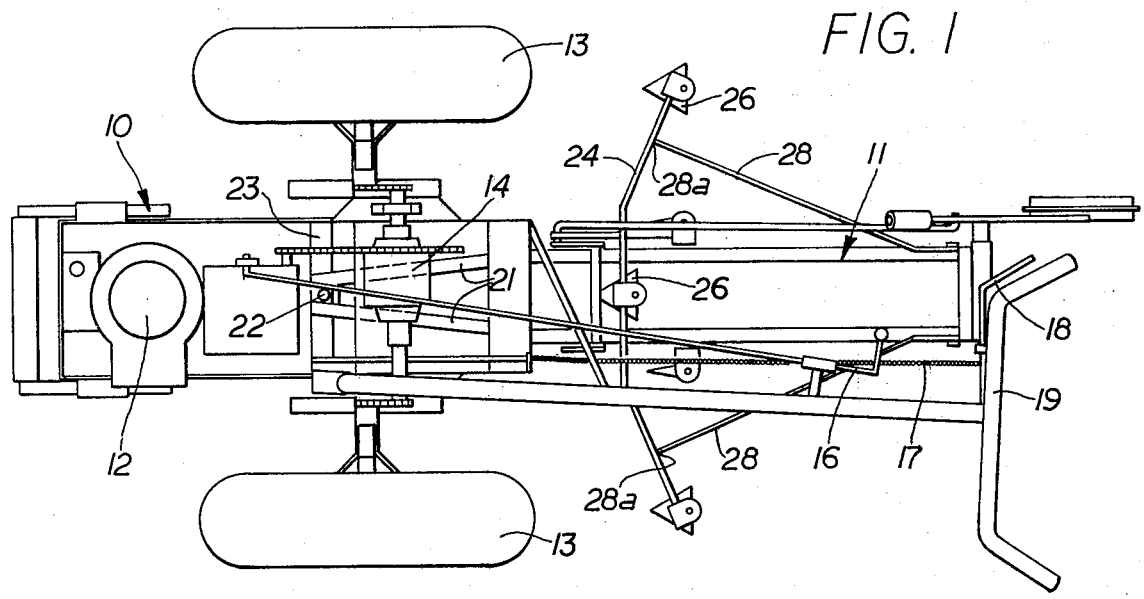
FIG. 1 is a plan view.
Figure 5:
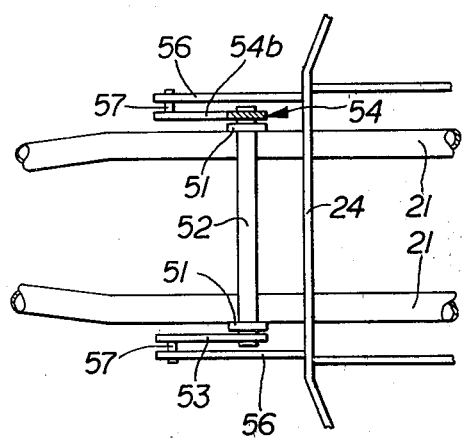
FIG. 5 is a fragmental plan view of the front end of the plow with certain parts broken away and in section.

Referring now to the drawings for a better understanding of my invention, I show the same as being adapted for towing by a two-wheel walking tractor illustrated generally by the numeral 10. My improved plow, including both frames thereof, is indicated generally by the numeral 11 in FIGS. 1 and 2.

As will be understood, the tractor 10 may comprise the usual engine 12, a pair of ground engaging driven wheels 13, a transmission box 14, a gear shift rod 16 and a throttle chain or rod 17 operated by a handle 18 associated with the guiding handles 19. It will be noted that the handles 19 are offset laterally of the tractor and of the plow 11 so that the operator may walk on unplowed or untilled ground.

My improved plow 11 comprises essentially three main elements. First, there is a draft frame made up of a pair of fore and aft extending tubes 21. These come together at the front as shown particularly in FIG. 1 and are pivotally connected as at 22 to a vertical pivot carried by a cross member 23 forming a part of the tractor frame structure. It will be noted that the pivotal connection 22 is forwardly of the center line of the wheels, as the assembly is viewed in FIG. 1. This makes more sensitive the turning of the plow compared to what would be the case if the pivot point was over the vertical line of the wheel axles. In other words, the pull or draft of the plow is picked up and imparted to the plow at a point on the tractor frame forwardly of the center line of the wheels and this gives the improvement mentioned.

The next principal element of the plow proper is a tool frame which is shown as comprising essentially a bar-like member 24 which crosses the draft frame tube members 21. A plurality of earth working tools such as plows 26, spaced apart for row cultivation if desired, may be mounted on the frame 24 by means of the clamps 27. As will be understood, these clamps permit vertical adjustment of the plow assemblies 26 in the customary fashion.

Extending rearwardly from the tool frame 24 are fairly heavy members 28 welded at their forward ends 28$^a$ to the tool frame 24. At their rear ends the members 28 are pivotally connected at 29 to brackets 31 welded to the tubes 21 forming the draft frame.

From what has been described it will be seen that the actual draft is imparted to the plows 26 from the rear end of the tool frame, through the pivotal connection 29, members 28 and thence to the tool frame 24.

The third principal element of my improved plow is a ground engaging wheel 32. The wheel is pivoted on a horizontal axis 33 carried at the lower end of an upstanding member 34. The member 34 is pivotally mounted at 36 to the side of a plate 37 which in turn is secured as by welding to the end of a tube 38. The tube 38 is telescopically received in a tube 39 which is welded to a cross member 41 which joins the rear ends of the tubes 21 of the draft frame.

The plate 37 may have a rounded forward edge 37$^a$ into which, at intervals, are cut notches 37$^b$. It will be recognized that the curved surface 37$^a$ is struck on a radius about the pivot pin 36 and thus forms a quadrant.

Pivotally mounted at 42 on a side of the member 34 is a dog 43 having an inturned end 43$^a$ adapted selectively to enter the notches 37$^b$ in the quadrant.

Secured to the member 34 is an upstanding handle member 44 which carries at its upper end a grip 46. The member 44 may be tubular. Passing through the member 44 is a control rod 47 pivotally connected at 48 to the dog 43, at a place thereon opposite the pivot point from the end 43$^a$. A button 49 on the upper end of the rod permits the same to be depressed, thus to raise the end 43$^a$ out of a given notch, permitting the members 44 and 34 to pivot about the point 36, thus to move the wheel 32 forwardly or rearwardly, thereby lowering or raising the rear ends of the plow frames.

Figure 2:
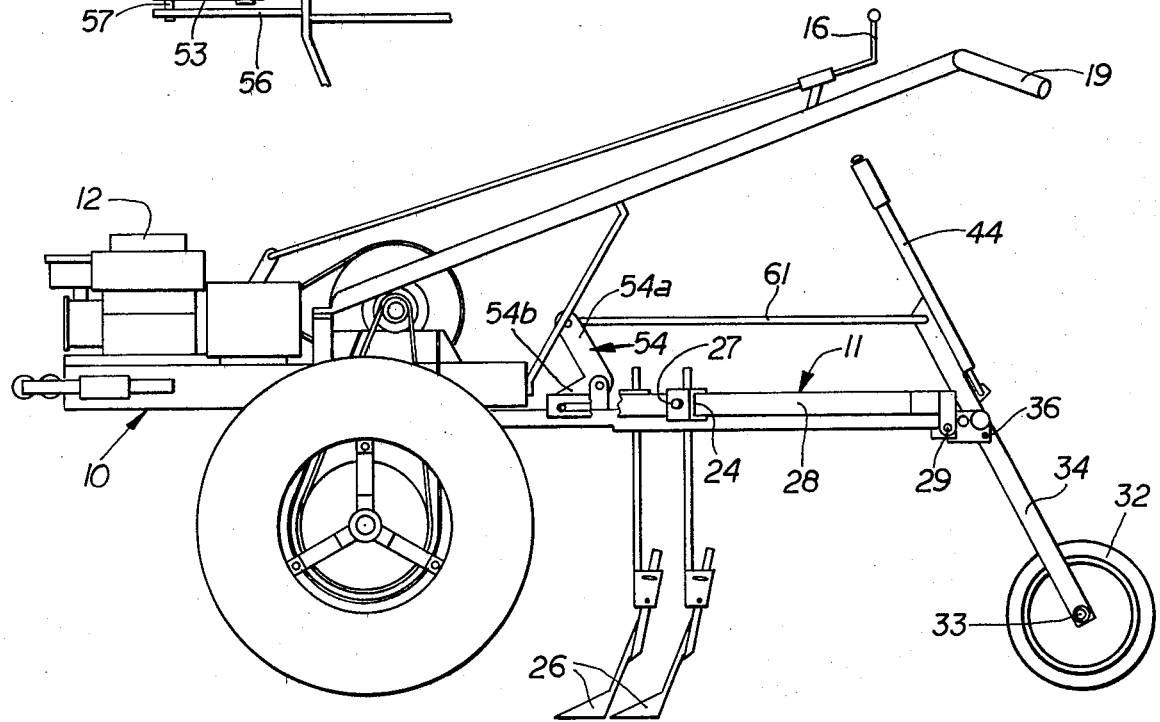
FIG. 2 is a side elevational view with certain parts broken away and in section.
Figure 4:
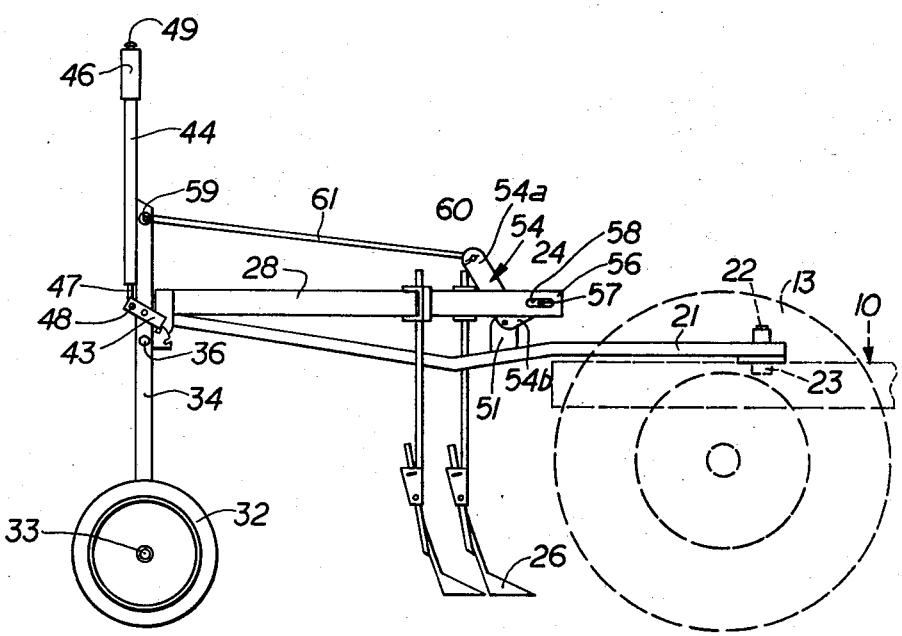
FIG. 4 is an enlarged side elevational view of the plow with the tools in raised position, only minimal portions of the tractor being shown in dotted lines.

In order simultaneously to further raise the plows out of the ground when the member 44 and the wheel are moved from the position of FIG. 2 to the position of FIG. 4, I provide a pivotal connection between the forward end of the tool frame 24 and the draft frame. Thus, I provide lugs 51 welded to the tubes 21. A cross shaft 52 is rotatably mounted in the lugs. On one end of the shaft 51 I non-rotatably mount a link 53. On the other end of the shaft 52 I non-rotatably mount a bell crank 54 which bell crank has an arm 54$^a$ extending upwardly and another arm 54$^b$ lying alongside a member 56 projecting forwardly from the tool frame 24. A pin 57 passes loosely through a slot 58 provided in the member 56.

At the opposite end of the shaft 52 a similar pin 57 passes through an identical slot 58 in an identical member 56 also secured at that side to the tool frame 24. Pivotally connected at 60 to the arm 54ᵃ and at 59 to the upper end of the member 34 is a link or connecting rod 61.

Figure 3:
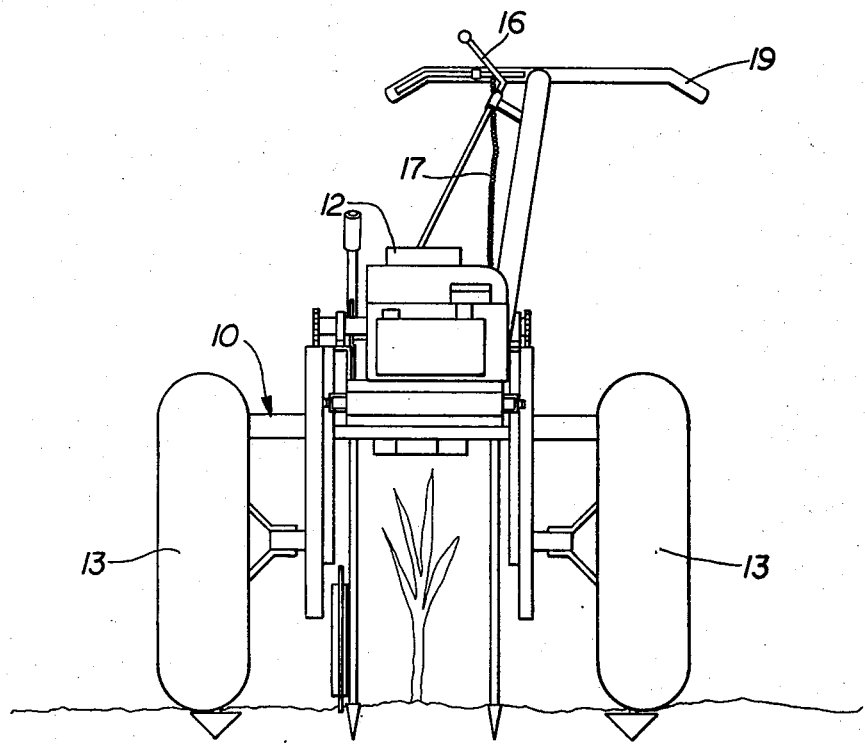
FIG. 3 is a rear elevational view.

It will first be noted that with the handle moved forwardly as indicated in FIGS. 1, 2 and 3, the plows are lowered into the ground, namely, are lowered to a level below the surface which supports the wheels of the tractor and the wheel 32. The wheel 32 in the position of FIGS. 1, 2 and 3 also has lowered the tool frame relative to the draft frame. Looking now at FIG. 4 it will be seen that the only thing necessary to do to raise the plows completely out of the ground is to move the handle 44 and hence member 34 and thence the wheel 32 from the position of FIG. 2 to the position of FIG. 4. When this is done the shaft 52 is rotated through the linkages shown by the rod 61 so that the links and bell crank lift the front end of the tool frame relative to the draft frame, to the position shown in FIG. 4. Thus, by a single motion of the manually controlled member 34 I simultaneously raise the rear ends of both of the frames and independently thereof raise the tool frame relative to the draft frame. Therefore, when using my improved plow when one comes to the end of the row by this very simple motion, the leverage of which is compounded to make the same extremely easy to accomplish, the plows may be raised above ground level permitting an easy turn-around.

Figure 6:
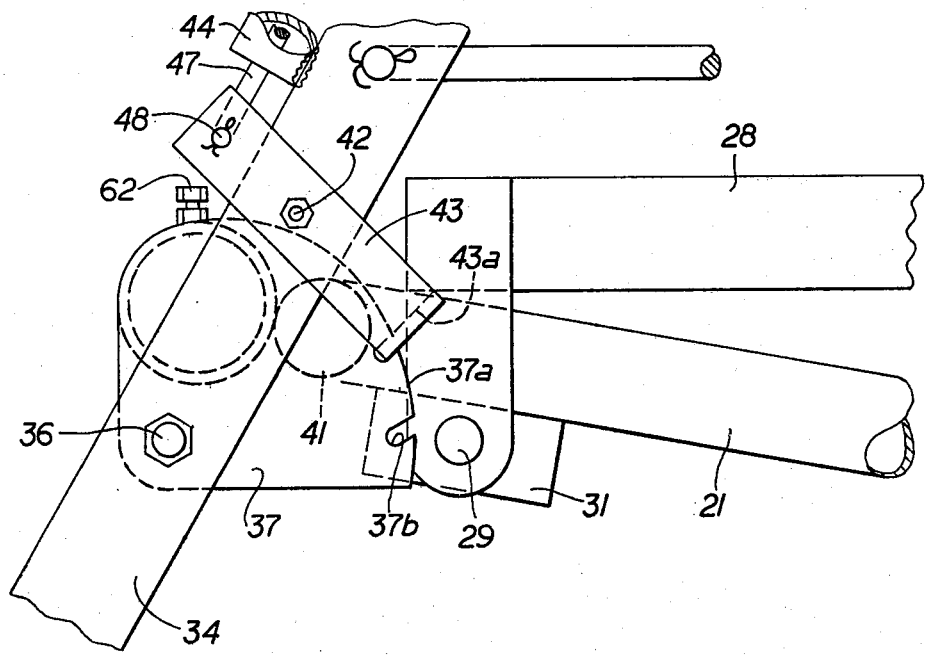
FIG. 6 is an enlarged detail fragmental view illustrating the linkage and pivotal connections of the draw frame and tool frame, at the rear end of the draw frame; and, FIG. 7 is a detail fragmental plan view of the mechanism shown in FIG. 6.
Figure 7:
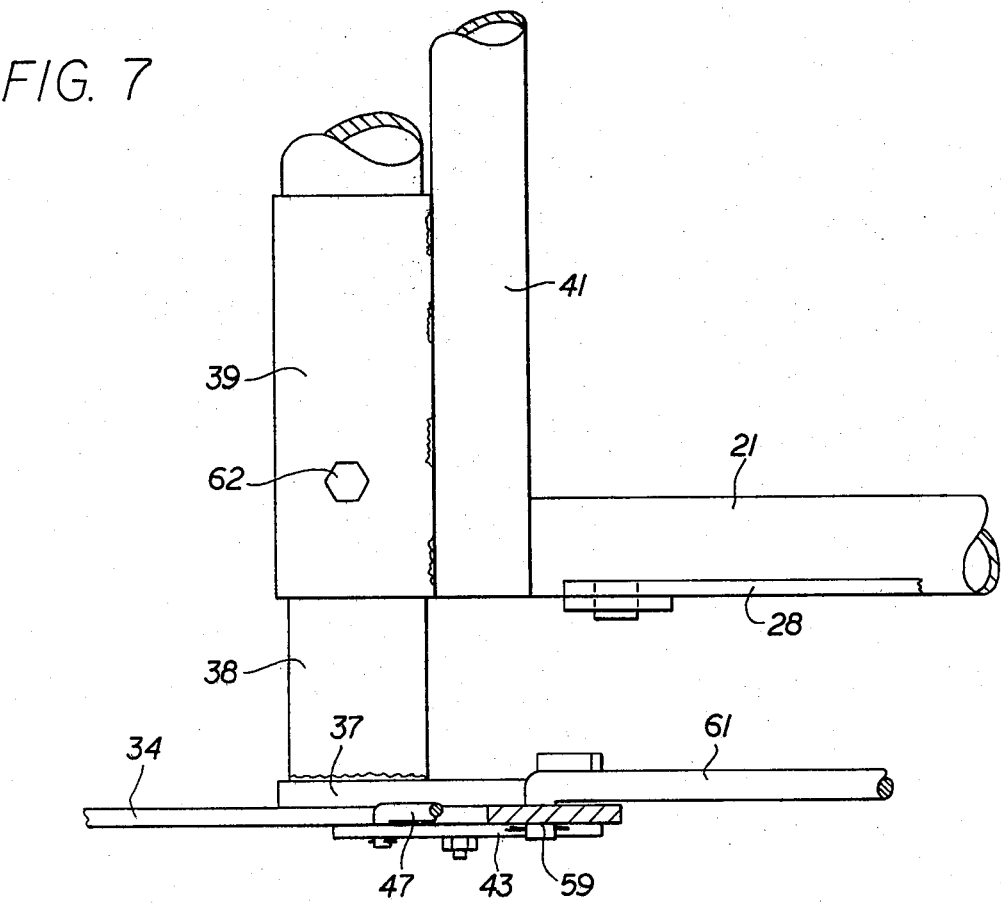

Referring again to FIGS. 6 and 7 it will be seen that the member 38 which carries the quadrant plate and the wheel carrying member 34 may be moved in and out relative to the pipe or tube 39. This provides easy means for setting the wheel 32 relative to a given row, and such movement within a sufficient range can be accomplished without disturbing the linkage in any way. The member 38 may be locked in selected positions by means of a screw 62.

From the foregoing it will be seen that I have devised an improved, simple and economical plow in which the manipulation of a single, readily accessible manual handle is effective to raise the working tools from the ground, eliminating the necessity of any lifting of the plow in order to make a turn-around at the end of a row.

While I have shown my invention in but one form, it will be obvious to those skilled in the art that it is not so limited, but is susceptible of various changes and modifications without departing from the spirit thereof.

What I claim is:

1. In a plow adapted to be towed behind a tractor or the like,
  (a) a fore and aft extending draw frame having a towing connection at its forward end for attachment to the towing vehicle,
  (b) a ground engaging wheel,
  (c) an assembly for mounting the wheel adjacent the rear of the draw frame comprising:
    (1) an upstanding member carrying an axle adjacent its lower end on which the wheel is journaled,
    (2) means connecting the upstanding member for pivotal movement relative to the rear end of the draw frame comprising a quadrant member connected to the rear end of the draw frame, and
    (3) manual means for pivoting said upstanding member comprising an upstanding handle, a dog pivoted to the upstanding member and having one end adapted to engage the quadrant, and an operating member for releasing the dog from the quadrant, whereby the rear end of the draw frame may be raised and lowered relative to the ground,
  (d) a tool frame disposed transversely of the draft frame located intermediate the rear end of the draft frame and said towing connection,
  (e) means pivotally connecting the tool frame for up and down movement relative to the draw frame,
  (f) draft members connected to the tool frame and extending rearwardly therefrom tne pivotally connected to the draft frame adjacent the rear end of the latter, and
  (g) a link connecting the means set forth in (e) above to the manual means set forth in (c) (3) above, whereby pivoting said upstanding member relative to the draw frame raises or lowers said tool frame relative to the draw frame and hence relative to the ground.

* * * * *